United States Patent
Koenig et al.

(10) Patent No.: US 9,318,757 B2
(45) Date of Patent: Apr. 19, 2016

(54) FUEL SUPPLY UNIT FOR A FUEL CELL SYSTEM, FUEL CELL SYSTEM AND METHOD FOR MONITORING A FUEL SUPPLY UNIT

(75) Inventors: Michael Koenig, Kollow (DE); Ralf-Henning Stolte, Hamburg (DE)

(73) Assignee: Airbus Deutschland GmbH, Hamburg (DE)

( * ) Notice: Subject to any disclaimer, the term of this patent is extended or adjusted under 35 U.S.C. 154(b) by 1244 days.

(21) Appl. No.: 12/522,702

(22) PCT Filed: Dec. 14, 2007

(86) PCT No.: PCT/EP2007/011023
§ 371 (c)(1),
(2), (4) Date: Feb. 16, 2010

(87) PCT Pub. No.: WO2008/083817
PCT Pub. Date: Jul. 17, 2008

(65) Prior Publication Data
US 2010/0140411 A1    Jun. 10, 2010

Related U.S. Application Data

(60) Provisional application No. 60/884,637, filed on Jan. 12, 2007.

(30) Foreign Application Priority Data

Jan. 12, 2007    (DE) .......................... 10 2007 001 912

(51) Int. Cl.
*B64D 37/06*    (2006.01)
*H01M 8/04*    (2006.01)

(52) U.S. Cl.
CPC ...... *H01M 8/04201* (2013.01); *H01M 8/04089* (2013.01); *H01M 8/04097* (2013.01); *H01M 8/04119* (2013.01); *H01M 2250/20* (2013.01); *Y02E 60/50* (2013.01); *Y02T 90/32* (2013.01)

(58) Field of Classification Search
USPC ....................... 244/58, 135; 73/40.7
See application file for complete search history.

(56) References Cited

U.S. PATENT DOCUMENTS 5,658,681 A    8/1997    Sato et al.
6,463,965 B1 *    10/2002    Rasche et al. ................... 141/65

(Continued)

FOREIGN PATENT DOCUMENTS

DE    10 2004 050 419    4/2006
DE    10 2005 010 399    9/2006

(Continued)

OTHER PUBLICATIONS

Hirose et al., Fuel cell system, Jun. 15, 2006, Japan Patent Office (JPO) (JP 2006-156261 A).*

(Continued)

*Primary Examiner* — Ula C Ruddock
*Assistant Examiner* — Osei Amponsah
(74) *Attorney, Agent, or Firm* — Taft Stettinius & Hollister LLP

(57) ABSTRACT

A fuel supply unit (10) for a fuel cell system which is in particular suitable for use in an aircraft comprises a fuel tank (12) and a feed line (14), which connects the fuel tank (12) to an inlet (16) of a fuel cell (18). A tank isolation valve (28) is disposed in the feed line (14). A removal line (46) connects an outlet (20) of the fuel cell (18) to an unpressurised region of the aircraft and/or the outer atmosphere. The fuel supply unit (10) also comprises a sensor (44) for detecting an electrical voltage in the fuel cell (18) and an electronic control unit (45) which is adapted to receive signals output from the sensor (44) and which is adapted to detect a fault caused by an unintentional opening or a failure of the tank isolation valve (28) based on the sensor signals, when in a quiescent operational state of the fuel cell system electrical energy is generated by the fuel cell (18).

14 Claims, 1 Drawing Sheet

(56) References Cited

U.S. PATENT DOCUMENTS

| | | | |
|---|---|---|---|
| 6,911,274 B1 * | 6/2005 | Colborn et al. | 429/410 |
| 6,964,821 B2 | 11/2005 | Hirakata | |
| 7,648,103 B2 * | 1/2010 | Barbosa et al. | 244/135 R |
| 7,799,477 B2 * | 9/2010 | Metzler et al. | 429/443 |
| 7,799,744 B2 * | 9/2010 | Welton et al. | 507/221 |
| 8,017,277 B2 * | 9/2011 | Bono | 429/444 |
| 2002/0192519 A1 | 12/2002 | Fujita et al. | |
| 2004/0031314 A1 * | 2/2004 | Flynn et al. | 73/40.7 |
| 2005/0202292 A1 | 9/2005 | Richards et al. | |
| 2008/0210812 A1 | 9/2008 | Gans et al. | |

FOREIGN PATENT DOCUMENTS

| | | | | |
|---|---|---|---|---|
| DE | 102005012120 | * | 9/2006 | H01M 8/04 |
| JP | 2006 156261 | | 6/2006 | |
| JP | 2006-156261 A | * | 6/2006 | H01M 8/04 |
| JP | 2006-156261 A | * | 6/2006 | H01M 8/04 |
| RU | 2 233 511 C1 | | 7/2004 | |
| WO | WO 00/74162 | | 12/2000 | |
| WO | WO 2005/093886 | | 10/2005 | |
| WO | WO 2006/094743 | | 9/2006 | |

OTHER PUBLICATIONS

PCT/EP2007/011023 International Search Report—Airbus Deutschland GmbH.

PCT/EP2007/011023 Written Opinion of the International Search Authority—Airbus Deutschland GmbH.

English Summary of DE 10 2004 050 419 A1, Apr. 27, 2006, Linde AG.

English language translation of Decision of Rejection in P.R. China, State Intellectual Poperty Office, Application No. 200780049728.1, Jul. 4, 2012.

English language translation of Decision on Granting from the Russian Federal Service for Intellectual Property Patents and Trademarks, Application No. 2009130065/07(041835), Aug. 17, 2011.

* cited by examiner

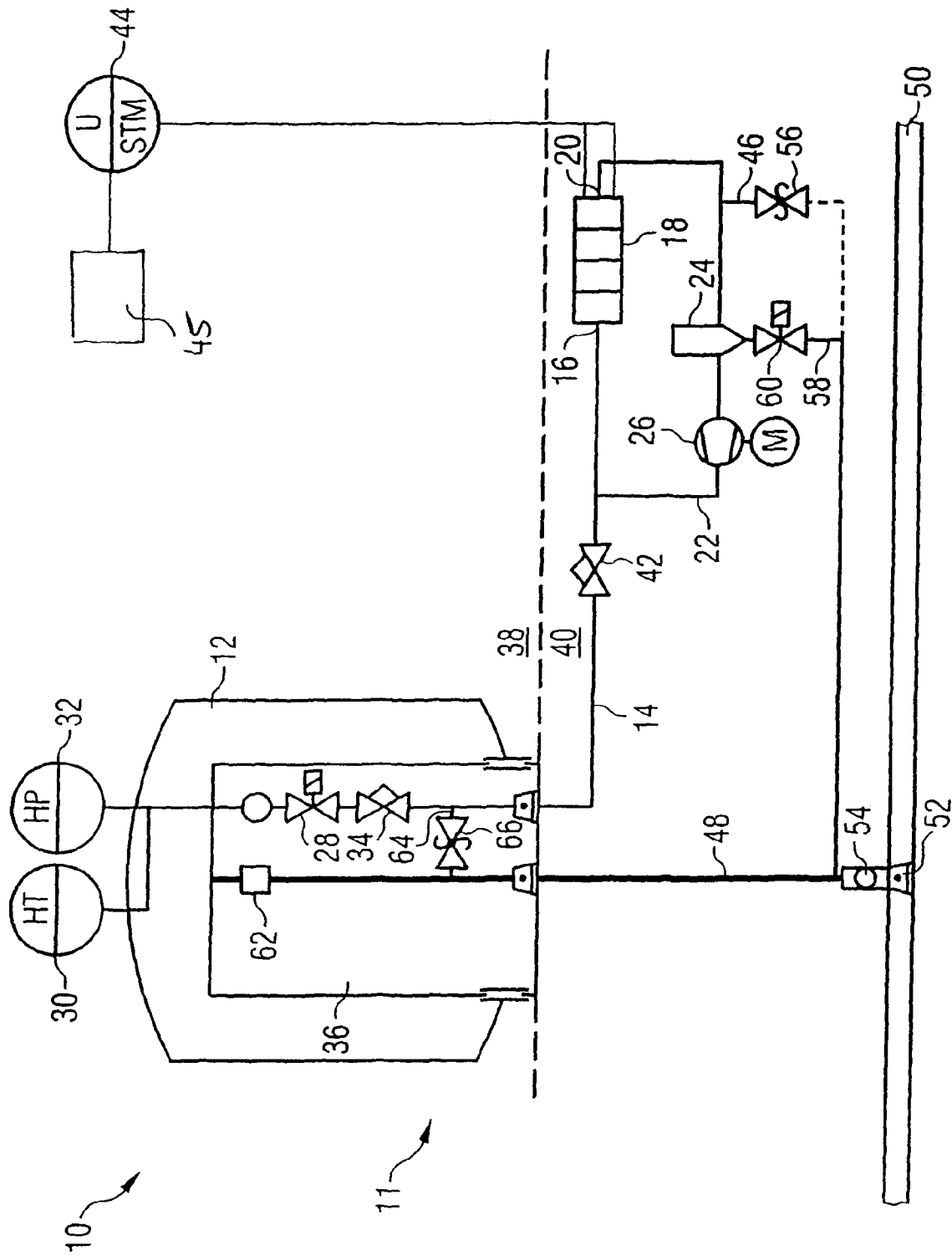

FUEL SUPPLY UNIT FOR A FUEL CELL SYSTEM, FUEL CELL SYSTEM AND METHOD FOR MONITORING A FUEL SUPPLY UNIT

CROSS REFERECE TO RELATED APPLICATIONS

The present application is a §371 national stage patent application of PCT/EP2007/011023, filed Dec. 14, 2007, which claims priority from German Patent Application No. 10 2007 001 912.4, filed Jan. 12, 2007 and claims the benefit of U.S. Provisional Patent Application No. 60/884,637, filed Jan. 12, 2007, each of which is incorporated herein by reference.

The present invention relates to a fuel supply unit for a fuel cell system which is in particular suitable for use in an aircraft, and a fuel cell system equipped with a fuel supply unit of this kind and a method for monitoring a fuel supply unit of this kind.

Fuel cell systems enable electric current to be generated with a low emission level and high efficiency. Therefore attempts are currently being made also in aircraft construction to use fuel cell systems to generate the electrical energy which is required on board an aircraft. For example, it is conceivable to replace the generators which are at present used for aircraft power supply and are driven by the main power units or the auxiliary turbine by a fuel cell system. A fuel cell system could also be used for the emergency power supply of the aircraft and replace the ram air turbine (RAT) which is presently used as an emergency power unit.

Fuel cells usually comprise a cathode region and an anode region which is separated from the cathode region by an electrolyte. During operation of the fuel cell a fuel, for example hydrogen, is fed to the anode side of the fuel cell and an oxygen-containing oxidizing agent, for example air, is fed to the cathode side of the fuel cell. In the case of a polymer electrolyte membrane fuel cell the hydrogen molecules react at an anode catalyst provided in the anode region, for example according to the equation

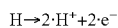

$$H \rightarrow 2 \cdot H^+ + 2 \cdot e^-$$

and in the process deliver electrons to the electrode while forming positively charged hydrogen ions.

The $H^+$ ions which are formed in the anode region subsequently diffuse through the electrolyte to the cathode, where they react at a cathode catalyst provided in the cathode region with the oxygen which is fed to the cathode and the electrons which are routed to the cathode via an external circuit according to the equation

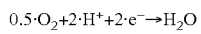

$$0.5 \cdot O_2 + 2 \cdot H^+ + 2 \cdot e^- \rightarrow H_2O$$

to form water.

The hydrogen which is required to supply the fuel cell can, for example, be carried in a liquid hydrogen tank or a pressure storage tank suitable for storing hydrogen gas under an elevated pressure on board the aircraft. Generally speaking, the hydrogen tank can be accommodated outside of the heated and pressurised region of the aircraft. It is easier to adequately ventilate the tank in the unpressurised region of the aircraft, so that a leakage in the tank system is less likely to lead to an accumulation of a critical quantity of hydrogen.

However, the accommodation of the hydrogen tank in the unpressurised region of the aircraft entails the disadvantage of the tank system being subject to considerable temperature and pressure variations which can cause damage to system components and therefore adversely affect the availability of the system. However, a limitation of the system availability is in particular intolerable, if the fuel cell system which is supplied with fuel from the hydrogen tank performs safety-relevant functions. This is the case, for example, if the fuel cell system is used instead of a RAT as the emergency power unit.

In order to guarantee the high system availability, which is required for safety-relevant applications on board an aircraft, for a fuel cell system which is supplied with fuel from a hydrogen tank system, the aim is therefore to dispose the hydrogen tank in the pressurised region of the aircraft. However, on account of the poorer ventilation of the pressurised region of the aircraft in comparison with the unpressurised region, special safety precautions are then required in order to prevent safety risks due to hydrogen escaping from the hydrogen tank system. The safety and building regulations in aviation in particular specify that a single-chance fault should not lead to the loss of the aircraft (such as, for example, in the event of an uncontrollable leakage in the hydrogen tank system). Moreover, the probability of the simultaneous occurrence of independent faults resulting in the loss of the aircraft should not exceed 10E-9 per flying hour.

In order to reach the required safety targets, an uncontrollable hydrogen leakage due to the tank bursting must in the first place be excluded. This can be guaranteed through appropriate qualification. It is possible to guard against the fault of an unintentional opening or a failure of a tank isolation valve by providing an additional hydrogen concentration sensor for detecting hydrogen leakages. It is also possible to provide a plurality of, i.e. at least two, serial tank isolation valves. However, the provision of an additional hydrogen concentration sensor and/or at least two serial tank isolation valves inevitably results in an increase in the complexity of the system and therefore possibly undesirable limitation of the system availability.

The object of the present invention is to provide a fuel supply unit for a fuel cell system which is in particular suitable for use in an aircraft and which enables a fuel tank system to be disposed safely in the pressurised region of the aircraft without adversely affecting the system availability. A further object of the invention is to present a fuel cell system equipped with a fuel supply unit of this kind and a method for monitoring a fuel supply unit of this kind.

This object is achieved by a fuel supply unit, a fuel cell system, and a method for monitoring a fuel supply unit having features as defined in the claims.

A fuel supply unit according to the invention for a fuel cell system which is in particular suitable for use in an aircraft comprises a fuel tank, for example a pressure storage tank suitable for storing hydrogen gas under an elevated pressure, which is intended to be disposed in a pressurised region of the aircraft. A feed line connects the fuel tank to an inlet of a fuel cell. The feed line can connect the fuel tank to a fuel inlet of an anode region of the fuel cell, for example. A tank isolation valve is disposed in the feed line, which serves to establish or to interrupt a fluid connection between the fuel tank and the inlet of the fuel cell. A removal line of the fuel supply unit according to the invention connects an outlet of the fuel cell to the outer atmosphere. The removal line can be connected to an anode exhaust gas connection of the fuel cell, for example. Finally, the fuel supply unit according to the invention comprises a sensor for detecting an electrical voltage in the fuel cell.

If the fault of an unintentional opening or a failure of the tank isolation valve occurs in the fuel supply unit according to the invention, fuel, for example hydrogen, flows out of the fuel tank through the feed line into the fuel cell, i.e. into an anode region of the fuel cell, for example. The fuel is chemically converted in the fuel cell, which results in a voltage increase in the fuel cell. For example, hydrogen which is fed to the anode region of the fuel cell reacts with atmospheric oxygen present in the cathode region of the fuel cell in the quiescent state of the fuel cell. The electrical energy generated as a result of this reaction can be detected by the voltage sensor. Signals output by the sensor are supplied to an electronic control unit. Based on the sensor signals the electronic control unit detects a fault caused by an unintentional opening or a failure of the tank isolation valve, when in a quiescent operational state of the fuel cell system, i.e. when the fuel cell actually should not be in operation, electrical energy is generated by the fuel cell. The voltage sensor and the electronic control unit therefore enable a hydrogen leakage caused by an unintentional opening or a failure of the tank isolation valve to be reliably detected. It is therefore possible to dispense with an additional hydrogen concentration sensor for detecting a hydrogen leakage of this kind in the fuel supply unit according to the invention.

Hydrogen which is not converted in the fuel cell is removed via the removal line from the fuel cell into a well ventilated, unpressurised region of the aircraft or directly into the outer atmosphere. An uncontrollable hydrogen leakage caused by an unintentional opening or a failure of the tank isolation valve can therefore be reliably prevented. It is consequently not necessary to provide a second tank isolation valve and the system availability can as a result be advantageously increased.

In the fuel supply unit according to the invention the fuel tank can be safely disposed in the pressurised region of the aircraft. This prevents the tank system from being subject to the considerable temperature and pressure variations in the unpressurised region of the aircraft, which has advantageous effects on the reliability and the life time of the system components. The required safety targets can at the same time be reached with the fuel supply unit according to the invention without increasing the complexity of the system and as a result adversely affecting the system availability. The fuel supply unit according to the invention is therefore particularly suitable for supplying fuel to a fuel cell system which performs safety-relevant functions and is to be used, for example, instead of a conventional RAT as an emergency power unit.

A first pressure relief valve is preferably disposed in the removal line of the fuel supply unit according to the invention. The first pressure relief valve can, for example, be in the form of a bursting disc and designed so that it opens the removal line if the pressure in the removal line exceeds a predetermined critical threshold value. This ensures that fuel which is fed into the fuel cell due to an unintentional opening or a failure of the tank isolation valve can be removed via the removal line into the outer atmosphere before the fuel pressure in the removal line reaches a safety-critical value.

The outlet of the fuel cell can be connected via a circulation line to the inlet of the fuel cell. For example, the recirculation line can connect an anode exhaust gas outlet of the fuel cell to a fuel inlet of the anode region of the fuel cell.

A water separator and/or a recirculation pump can be disposed in the recirculation line. The water separator serves to remove water from gas exiting the outlet of the fuel cell before it is returned to the inlet of the fuel cell. The water which is obtained in the process can be removed from the water separator or, for example, used to moisten an electrolyte membrane of the fuel cell. The recirculation pump guarantees a sufficient fuel supply during operation of the fuel cell.

The water separator can be connected to the removal line upstream of the first pressure relief valve via a first connecting line. A scavenging valve is preferably disposed in the first connecting line. In a configuration of this kind of the fuel supply unit according to the invention water which has been separated from the fuel cell exhaust gas in the water separator can be removed via the first connecting line and the removal line from the recirculation line when the scavenging valve is open. However, with the exception of the scavenging cycles, the scavenging valve is closed, thereby guaranteeing that fuel which is fed into the fuel cell via the feed line due to an intentional opening or a failure of the tank isolation valve can be safely removed into the well ventilated, unpressurised region of the aircraft and directly into the outer atmosphere via the removal line.

The removal line preferably branches off the recirculation line upstream of the water separator. It is therefore possible to dispense with an additional outlet connection of the fuel cell for connecting the fuel cell to the removal line.

In one preferred embodiment of the fuel supply unit according to the invention a safety line connects the fuel tank which is intended to be disposed in the pressurised region of the aircraft to the unpressurised region of the aircraft and/or the outer atmosphere. A second pressure relief valve can be disposed in the safety line. The second pressure relief valve, which, for example, is likewise in the form of a bursting disc, serves to connect the fuel tank to the well ventilated, unpressurised region of the aircraft or directly to the outer atmosphere, if a fuel pressure in the safety line exceeds a predetermined critical threshold value. The safety line can, for example, be connected to a pressure discharge opening provided in an outer skin of the aircraft. The pressure discharge opening can be provided with a closure indicator in order to render the discharge of fuel from the fuel tank visually detectable.

The removal line of the fuel supply unit according to the invention can lead into the safety line. It is therefore possible to dispense with a separate pressure discharge opening formed in the outer skin of the aircraft, for example, for the removal line.

A filter element is preferably disposed in the safety line. The filter element is preferably located in the vicinity of the pressure discharge opening formed in the outer skin of the aircraft, for example, and downstream of the branching of the removal line and prevents dirt from entering the safety line and the removal line.

In one preferred embodiment of the fuel supply unit according to the invention the feed line is connected to the safety line downstream of the tank isolation valve disposed in the feed line via a second connecting line. A third pressure relief valve which, for example, is likewise in the form of a bursting disc can be disposed in the second connecting line.

A line cross section of the feed line is preferably selected and the third pressure relief valve which is disposed in the second connecting line is preferably dimensioned so that the third pressure relief valve is opened, if a pressure in the feed line exceeds a predetermined critical pressure. In a configuration of this kind of the fuel supply unit according to the invention fuel exiting the fuel tank via the feed line can therefore be directly removed from the pressurised region of the aircraft via the safety line when the critical pressure causing the third pressure relief valve to open is exceeded without having to be routed through the fuel cell beforehand. The critical pressure for opening the third pressure relief valve may, for example, be higher than the critical pressure for opening the first pressure relief valve. In the case of small fuel leakages the fuel can then be removed from the pressurised region of the aircraft via the fuel cell and the removal line, whereas in the case of larger leakages the fuel can be directly removed via the second connecting line and the safety line.

At least one pressure reducing valve is preferably disposed in the feed line. For example, a first pressure reducing valve can be provided in the feed line downstream of the tank isolation valve, which reduces the fuel pressure in the feed line from, for example 350 bar to, for example, 9 bar. If a valve block comprising the tank isolation valve and the first pressure reducing valve is formed as an integrated system component of the fuel tank system, the first pressure reducing valve acts as an interface valve which separates a high-pressure region of the system on the fuel tank side from a low-pressure region of the system. For example, the tank isolation valve and the first pressure reducing valve can be constructed inside the fuel tank container. It is as a result advantageously possible to form an interface between the fuel tank and the system components disposed outside of the fuel tank as a low-pressure interface.

A second pressure reducing valve can be disposed in the feed line downstream of the first pressure reducing valve, which reduces the pressure in the feed line from, for example 9 bar to, for example, 3 bar. It is possible to ensure, by means of the second pressure reducing valve, that fuel at the desired pressure is fed to the anode region of the fuel cell. The second pressure reducing valve can likewise be formed as an integrated component of the fuel tank system and, for example, constructed inside the fuel tank container.

In the fuel supply unit according to the invention a fuel, for example, hydrogen, which is stored in the fuel tank is odorised. The system safety is increased through the additional odorisation of the fuel, as a fuel leakage can be identified more easily and quickly through the smell of the odorised fuel. The fuel which is stored in the fuel tank is preferably odorised so that a fuel leakage is "smellable" even at 20% of the lower flammability limit (LFL).

A fuel cell system according to the invention comprises a fuel supply unit as described above.

A method for a monitoring a fuel supply unit described above according to the invention comprises the steps of detecting an electrical voltage in the fuel cell by means of a sensor, supplying the signals output from the sensor to an electronic control unit and evaluating the sensor signals by means of the electronic control unit to detect a fault caused by an unintentional opening or a failure of the tank isolation valve, when in a quiescent operational state of the fuel cell system electrical energy is generated by the fuel cell.

A preferred embodiment of the present invention is now illustrated in detail on the basis of the accompanying schematic FIGURE, which shows a fuel supply unit for a fuel cell system which is intended for use on board an aircraft.

In the FIGURE a fuel supply unit 10, which is disposed in a pressurised region 11 of an aircraft, comprises a fuel tank 12 which is suitable for storing hydrogen gas under an elevated pressure. The fuel tank 12 is connected to a fuel inlet 16 of a fuel cell 18 via a feed line 14.

The fuel cell 18, which serves instead of a conventional RAT as an emergency power unit, is formed as a polymer electrolyte membrane fuel cell and comprises an anode region which is connected to the fuel inlet 16 and is separated from a cathode region by a polymer electrolyte membrane. An anode exhaust gas outlet 20 of the fuel cell 18 is connected to a recirculation line 22, via which anode exhaust gas exiting the anode exhaust gas outlet 20 during operation of the fuel cell 18 can be returned to the fuel inlet 16 of the fuel cell 18.

A water separator 24 is disposed in the recirculation line 22. The water separator 24 serves to remove water from anode exhaust gas exiting the anode exhaust gas outlet 20 during operation of the fuel cell 18. A recirculation pump 26 is disposed in the recirculation line 22 downstream of the water separator 24. The recirculation pump 26 guarantees a sufficient fuel supply to the anode region of the fuel cell 18 during operation of the fuel cell 18.

A tank isolation valve 28 is disposed in the feed line 14 connecting the fuel tank 12 to the fuel inlet 16 of the fuel cell 18. Upstream of the tank isolation valve 28 the feed line 14 is connected to a temperature sensor 30 and a pressure sensor 32 for detecting the temperature and the pressure in the feed line 14.

A first pressure reducing valve 34 is disposed in the feed line 14 downstream of the tank isolation valve 28, which reduces the pressure in the feed line 14 from approximately 350 bar to approximately 9 bar. The first pressure reducing valve 34 therefore forms an interface valve which separates a high-pressure region 38 of the unit 10 which comprises the fuel tank 12 and a valve block 36 integrated with the fuel tank 12 from a low-pressure region 40 of the unit 10.

A second pressure reducing valve 42 is disposed in the feed line 14 downstream of the first pressure reducing valve 34, which reduces the pressure in the feed line 14 from approximately 9 bar to approximately 3 bar. The second pressure reducing valve 42 therefore ensures that hydrogen at the desired pressure is fed to the fuel cell inlet 16 of the fuel cell 18 during operation of the fuel cell 18.

The fuel supply unit 10 also comprises a voltage sensor 44 which detects an electrical voltage in the fuel cell 18. Signals which are emitted by the voltage sensor 44 are transmitted to an electronic control unit 45 and accordingly evaluated by the electronic control unit 45. The electronic control unit 45 also receives signals indicative of the operational state of the fuel cell system 10.

A removal line 46 branches off the recirculation line 22 upstream of the water separator 24 and the recirculation pump 26. The removal line 46 connects the anode exhaust gas outlet 20 of the fuel cell 18 to a safety line 48. A first end of the safety line 48 is connected to the fuel tank 12. On the other hand, a second end of the safety line 48 leads into the outer atmosphere via a pressure discharge opening formed in an outer skin 50 of the aircraft. A nozzle 52 is provided in the region of the pressure discharge opening, which serves to render the discharge of hydrogen from the fuel tank 12 via the safety line 48 visible. A filter element 54 is disposed in the safety line 48 upstream of the nozzle 52. The filter element 54 prevents dirt from entering the safety line 48 and the removal line 46.

A first pressure relief valve 56 in the form of a bursting disc is disposed in the removal line 46. The first pressure relief valve 56 is designed so that it connects the anode outlet 20 of the fuel cell 18 to the outer atmosphere via the removal line 46 and the safety line 48, if a pressure in the removal line 46 exceeds a predetermined critical threshold value.

The water separator 24 disposed in the recirculation line 22 is connected to the removal line 46 via a first connecting line 58. A scavenging valve 60 is disposed in the first connecting line 58. During operation of the fuel cell 18 water which has been separated from the anode exhaust gas of the fuel cell 18 can therefore be removed via the first connecting line 58, the removal line 46 and the safety line 48 into the outer atmosphere when the scavenging valve 60 is open. However, with the exception of these scavenging cycles, the scavenging valve 60 is closed.

A second pressure relief valve 62, which is likewise in the form of a bursting disc, is disposed in the safety line 48 connecting the fuel tank 12 to the outer atmosphere. The second pressure relief valve 62 opens the safety line 48 and hence a fluid connection between the fuel tank 12 and the outer atmosphere, if a pressure in the safety line 48 exceeds a predetermined critical threshold value.

A second connecting line 64 branches off the feed line 14 downstream of the first pressure reducing valve 34 and leads into the safety line 48 downstream of the second pressure relief valve 62. A third pressure relief valve 66 is disposed in the second connecting line 64. A line cross section of the feed line 14 is selected and the third pressure relief valve 66, which is likewise in the form of a bursting disc, is dimensioned so that the third pressure relief valve 66 opens the second connecting line 64 and hence a fluid connection between the feed line 14 and the safety line 48 if a pressure in the feed line 14 exceeds a predetermined critical threshold value.

The tank isolation valve 28 and the scavenging valve 60 of the fuel supply unit 10 both are formed as solenoid valves and can, for example, be controlled by means of an electronic control unit, which is not shown in the FIGURE.

The mode of operation of the fuel supply unit 10 is illustrated in the following. During operation of the fuel cell 18, which serves as an emergency power unit, hydrogen is fed to the fuel inlet 16 of the fuel cell 18 via the feed line 14 while the tank isolation valve 28 is open. The pressure of the hydrogen which is fed to the fuel cell 18 is controlled by the pressure reducing valves 34, 42. In the fuel cell 18 the hydrogen is chemically converted with atmospheric oxygen which is fed to the cathode region of the fuel cell 18 while generating electrical energy.

Anode exhaust gas exiting the anode exhaust gas outlet 20 of the fuel cell 18 is returned to the fuel inlet 16 of the fuel cell 18 via the recirculation line 22 by means of the recirculation pump 26. Water which is contained in the anode exhaust gas is separated from the anode exhaust gas by means of the water separator 24 disposed in the recirculation line 22. The scavenging valve 60 is opened in order to remove the water from the water separator 24, so that the water can be removed from the water separator 24 into the outer atmosphere via the first connecting line 58, the removal line 46 and the safety line 48.

As the fuel cell 18 serves as an emergency power unit, the fuel cell 18 does not operate during normal ground handling and flying operations of the aircraft. However, it is necessary to ensure during these quiescent phases that an unintentional opening or a failure of the tank isolation valve 28 does not lead to a safety risk which may result in the loss of the aircraft. Moreover, an unintentional opening or a failure of the tank isolation valve must be detected, in order to have the possibility to increase the system availability through specific maintenance. If the fault of an unintentional opening or a failure of the tank isolation valve 28 occurs, hydrogen is fed out of the fuel tank 12 to the fuel inlet 16 of the fuel cell 18 via the feed line 14. In the fuel cell 18 this hydrogen reacts with atmospheric oxygen present in the cathode region of the fuel cell. As is the case during operation of the fuel cell 18, this chemical reaction in the fuel cell 18 results in an increase in the electrical voltage in the fuel cell 18, which can be detected by means of the voltage sensor 44. The signals of the voltage sensor 44 are supplied to the electronic control unit 45. When the electronic control unit 45 based on the signals indicative of the operational state of the fuel cell system 10 detects that the fuel cell system 10 is in a quiescent operational state in which the fuel cell 18 should not generate electrical energy, the generation of electrical energy by the fuel cell 18 as detected by the voltage sensor 44 is attributed to a fault caused by an unintentional opening or a failure of the tank isolation valve 28. The electronic control unit 45 then can output a respective warning signal and/or initiate appropriate safety measures.

Hydrogen which is not converted in the fuel cell 18 leaves the fuel cell 18 via the anode exhaust gas outlet 20 and passes into the removal line 46 via the recirculation line 22. If the hydrogen pressure in the removal line 46 exceeds the predetermined critical pressure threshold value, the first pressure relief valve 56 opens the removal line 46. As the scavenging valve 60 is closed, the hydrogen exiting the anode exhaust gas outlet 20 of the fuel cell 18 can therefore be safely removed into the outer atmosphere via the removal line 46 and the safety line 48. The configuration of the fuel supply unit 10 therefore makes it possible to dispense with an additional hydrogen concentration sensor and with a second tank isolation valve.

In the case of a larger leakage of the tank isolation valve 28 resulting in a hydrogen pressure increase in the feed line 14 to above the pressure threshold value required to open the third pressure relief valve 66, the opening of the third pressure relief valve 66 ensures that the hydrogen exiting the fuel tank 12 can be safely removed into the outer atmosphere via the second connecting line 64 and the safety line 48. The safety of the fuel supply unit 10 can therefore be further increased by the second connecting line 64 and the third pressure relief valve 66 disposed in the second connecting line 64.

The invention claimed is:

1. A fuel supply unit for an aircraft fuel cell system, wherein the fuel supply unit comprises:

A pressure storage fuel tank configured to store hydrogen gas under an elevated pressure, which is disposed within a pressurized region of the aircraft, wherein the pressurized region is characterized by a pressure that develops internal to the region at a level irrespective of the internal pressure of the pressure storage fuel tank, a feed line, which connects the pressure storage fuel tank to an inlet of a fuel cell, a tank isolation valve, which is disposed in the feed line, a removal line, which connects an outlet of the fuel cell to an unpressurised region of the aircraft and/or the outer atmosphere, a sensor for detecting an electrical voltage in the fuel cell, an electronic control unit which is adapted to receive signals output from the sensor and which is adapted to detect a fault caused by an unintentional opening or a failure of the tank isolation valve based on the sensor signals, when in a quiescent operational state of the fuel cell system electrical energy is generated by the fuel cell, a safety line which connects the pressure storage fuel tank to the unpressurized region of the aircraft and/or the outer atmosphere, and a first pressure relief valve disposed in the removal line and connecting an anode outlet of the fuel cell to the unpressurized region of the aircraft and/or outer atmosphere via the removal line and the safety line when a pressure in the removal line exceeds a threshold; and a second pressure relief valve is disposed in the safety line and structured to discourage flow of fluid therethrough at a first position and relieve pressure and thereby permit flow of fluid therethrough at a second position.

2. The fuel supply unit of claim 1, wherein characterized in that a recirculation line connects the outlet of the fuel cell to the inlet of the fuel cell.

3. The fuel supply unit of claim 2, wherein a water separator and/or a recirculation pump are/is disposed in the recirculation line.

4. The fuel supply unit of claim 3, wherein the water separator is connected to the removal line via a first connecting line downstream of the first pressure relief valve, wherein a scavenging valve is disposed in the first connecting line.

5. The fuel supply unit of claim 3, wherein the removal line branches off the recirculation line upstream of the water separator.

6. The fuel supply unit of claim 1, wherein the removal line opens into the safety line.

7. The fuel supply unit of claim 1, wherein a filter element is disposed in the safety line.

8. The fuel supply unit of claim 1, wherein the feed line is connected to the safety line via a second connecting line, wherein a third pressure relief valve is disposed in the second connecting line.

9. The fuel supply unit of claim 8, wherein a line cross section of the feed line is selected and the third pressure relief valve which is disposed in the second connecting line is dimensioned so that the third pressure relief valve is opened, if a pressure in the feed line exceeds a predetermined critical pressure.

10. The fuel supply unit of claim 1, wherein at least one pressure reducing valve is disposed in the feed line.

11. The fuel supply unit of claim 1, wherein a fuel which is stored in the pressure storage fuel tank is odorized.

12. The fuel supply unit of claim 6, wherein the second pressure relief valve is positioned upstream of the location where the removal line opens into the safety line.

13. The fuel supply unit of claim 8, wherein the second connecting line opens into the feed line at a location downstream of the tank isolation valve and upstream of the inlet to the fuel cell.

14. An aircraft and fuel cell system comprising:
   an aircraft having a pressure storage fuel tank configured to store fuel under elevated pressure which is disposed within a pressurized region of the aircraft, wherein the pressurized region is characterized by a pressure that develops internal to the region at a level irrespective of an internal pressure of the pressure storage fuel tank;
   a safety line which connects the pressure storage fuel tank to an unpressurized region of the aircraft and/or the outer atmosphere;
   a fuel cell installed in the aircraft and having an inlet structured to receive fuel from the pressure storage fuel tank, the fuel cell also having and an anode outlet;
   a feed line that fluidly connects the pressure storage fuel tank to the fuel cell via the inlet;
   a connecting line between the feed line to the fuel cell and the safety line from the pressure storage fuel tank;
   a recirculation line disposed between the anode outlet and the inlet of the fuel cell and structured to return exhaust from the anode outlet to the inlet;
   a removal line configured to deliver exhaust from the anode outlet of the fuel cell to the unpressurised region of the aircraft and/or the outer atmosphere;
   a first pressure relief valve disposed in the removal line and connecting the anode outlet of the fuel cell to the unpressurized region of the aircraft and/or outer atmosphere via the removal line and the safety line when a pressure in the removal line exceeds a threshold;
   a second pressure relief valve disposed in the safety line between the pressure storage fuel tank and the unpressurized region of the aircraft and/or the outer atmosphere, wherein the second pressure relief valve is structured to discourage flow of fluid therethrough at a first position and relieve pressure and thereby permit flow of fluid therethrough at a second position;
   a third pressure relief valve disposed in the connecting line to permit fluid communication from the feed line to the safety line;
   a sensor for detecting an electrical voltage in the fuel cell; and
   an electronic control unit which is adapted to receive signals output from the sensor and which is adapted to detect a fault caused by an unintentional opening or a failure of the tank isolation valve based on the sensor signals, when in a quiescent operational state of the fuel cell system electrical energy is generated by the fuel cell.

\* \* \* \* \*